United States Patent Office 2,924,626
Patented Feb. 9, 1960

2,924,626

PROCESS FOR MAKING 1-CHLORO-2-FLUOROETHYLENE

William M. Boyer, Country Club Hills, and Gilbert Gavlin, Lincolnwood, Ill., assignors to The Richardson Company, Melrose Park, Ill., a corporation of Ohio No Drawing. Application February 24, 1959
Serial No. 794,800

7 Claims. (Cl. 260—653.5)

This invention relates to a process for making 1-chloro-2-fluoroethylene.

Two processes have been proposed in the prior art for making 1-chloro-2-fluoroethylene (CHCl=CHF). One process is disclosed in U.S. Patent No. 2,377,297 wherein the following series of reactions are used:

$$CHCl=CHCl+Br_2 \rightarrow CHClBr-CHClBr$$

$$CHClBrCHClBr+SbF_3SbCl_5 \rightarrow CHClBr-CHClF$$

$$CHClBr-CHClF+Zn+H_2O \rightarrow CHCl=CHF$$

Zinc dehalogenation is also suggested by F. Swarts (Chem. Zent. I. 13, 1903) wherein 1-chloro-2-fluoroethylene is made as follows, from either trichlorofluoroethane or 1,1-dichloro-2,2-difluoroethane:

$$CHCl_2-CHFCl+Zn \rightarrow CHCl=CHF$$

$$CHCl_2-CHF_2+Zn \rightarrow CHCl=CHF$$

The present invention has as its primary object the provision of a new and improved process for making 1-chloro-2-fluoroethylene which is relatively inexpensive and results in reasonably high yields. This and other objects will become apparent from the further disclosure hereinafter.

It is known that ethanes, having the general formula $CH_2XCHX_2$, wherein "X" is a halogen, readily undergo a loss of HX in the presence of a moderate base resulting in the formation of compounds having the formula $CH_2=CX_2$. For example, $CH_2ClCHCl_2$ may be reacted with lime to form $CH_2=CCl_2$ in high yield. However, an unusual phenomenon has been observed with one specie of the above type of ethane, namely $CH_2ClCHFCl$, in that, when this compound is subjected to treatment with either a strong base or the fluoride salt of an alkali or alkaline earth metal, the compound CHCl=CHF (1-chloro-2-fluoroethylene) is formed in predominant yields, with lesser amounts of the expected $CH_2=CFCl$.

Typical bases which may be used are alkalis, such as sodium hydroxide and potassium hydroxide as well as an alkaline earth hydroxide like calcium hydroxide. Sodium and potassium fluoride are particularly suitable as the alkali fluoride for the alternate method. The base is normally used in solution with an appropriate solvent, whereas the fluorides are reacted in the solid state.

Various compounds may be employed as a solvent for the base, typical examples being alcohols and polyalcohols, such as methanol, ethanol, diethylene glycol, ethylene glycol and diethylene glycol dimethyl ether. Preferably, the solvent should have a boiling point higher than that of the 1-chloro-2-fluoroethylene in order to eliminate carry-over of solvent when the reaction mixtures are subjected to distillation. The concentration of the base in the solvent may vary from relatively weak to quite concentrated.

When reacting the base with 1,2-dichloro-2-fluoroethane, the halide is preferably added to the alkali solution at a temperature of about 100° C. At this temperature, the reaction begins immediately and is usually completed in a matter of minutes. When the alternate fluoride method is used, the reactants are mixed in a sealed vessel and preferably heated to a temperature of about 250° C., the reaction being somewhat slower than the corresponding reaction with a base.

The two reactions are believed to proceed in accordance with the following equations, potassium compounds being used as exemplary:

(1) Base $$CH_2ClCHFCl+KOH \rightarrow CHCl\\=CHF+CH_2=CFCl+KCl+H_2O$$

(2) Fluoride $$CH_2ClCHFCl+KF \rightarrow CHCl=CHF+CH_2=CFCl+HCl$$

plus the concurrent reaction $$2KF+HCl \rightarrow KCl+KF \cdot HF$$

Temperatures used for either of the reactions may be varied, however, lower temperatures generally produce slower reactions and higher temperatures result in a faster reaction. Further, it has been found that, if the reaction involving the fluoride salt is conducted in a sealed vessel composed predominantly of iron as distinguished from other materials, such as nickel, the reaction appears to be catalyzed to the extent that it proceeds more rapidly.

As further illustrating the invention, but without intending to thereby limit the same, the following two examples are presented.

Example I 63.8 grams (1.14 moles) of KOH were dissolved in 500 ml. of diethylene glycol in a flask fitted with a dropping funnel, a thermometer, a stirrer and connected to two traps cooled with Dry Ice. 117 grams (1.00 mole) of $CH_2Cl-CHFCl$ were then added to the KOH solution over a period of twenty minutes at a temperature of 100–5° C. Following the addition of the base, the reaction mixture was heated to 127° C. and then cooled.

The contents of the traps were distilled through a fractionating column. The total amount of fractionated organic material recovered was 84% of the theoretical yield. No starting $CH_2ClCHFCl$ was recovered. Three materials were found in the distillate, namely thirty percent $CH_2=CFCl$, B.P. −18° C., polymerizable with peroxides and containing 44.7% by weight Cl; and seventy percent CHCl=CHF, consisting of two portions, B.P. −3° and +15°, determined to be the cis and trans isomers. The −3° fraction contained 43.8% by weight Cl and the +15° fraction contained 40.0% by weight Cl. Theoretical chlorine for all of these compounds is 44.1%.

Example II 58 grams (1.00 mole) of KF and 117 grams (1.00 mole) of $CH_2ClCHFCl$ were rotated and heated under pressure at 249.0 to 250.8° C. for twenty-four hours. The contents of the bomb were then distilled out and fractionated. The bomb solids showed 57.7% by weight KCl representing 50.6 mole percent KCl or 50.6% reaction. The volatiles were separated by fractionation into three principal fractions. The largest fraction recovered was $CH_2ClCHFCl$. The material that had a boiling point below 3.8° C., a vapor-density molecular weight of 80.8, was determined to be $CH_2=CFCl$. The material boiling 15–16.5° C. contained 44.0% by weight Cl, had a vapor-density molecular weight of 82.1 and a molecular weight, by bromine absorption, of 86.4. A formula of $C_2H_2FCl$ requires a molecular weight of 80.5 and 44.1% by weight Cl. The material boiling at 15–16.5° C. was determined to be CHCl=CHF.

1-chloro-2-fluoroethylene may be copolymerized with a variety of monomers containing an unsaturated group producing polymers having exceptional properties, for example, resistance to light and substantially or completely nonflammable. Polymerized vinylidene fluoride is presently being used as chemical resistant material in the formation of commercial articles, such as gaskets and similar packing. 1-chloro-2-fluoroethylene may be readily copolymerized with vinylidene fluoride to form similar articles. Further, the copolymer has improved properties, such as melting point, over either of the monomers, a characteristic which is somewhat uncommon in the polymer field.

Having disclosed the invention and certain embodiments thereof, the same is only intended to be limited by the scope of the following claims.

We claim:

1. A process for preparing 1-chloro-2-fluoroethylene which comprises subjecting 1,2-dichloro-2-fluoroethane to the action of a member of the class consisting of a strong base, an alkali fluoride and an alkaline earth fluoride.

2. A process for preparing 1-chloro-2-fluoroethylene which comprises subjecting 1,2-dichloro-2-fluoroethane to the action of an alkali selected from the class consisting of sodium hydroxide and potassium hydroxide, said alkali being dissolved in a solvent having a higher boiling point than said 1-chloro-2-fluoroethylene.

3. A process as described in claim 2 wherein said solvent is a polyhydroxy alcohol.

4. A process as described in claim 3 wherein the reaction is conducted at a temperature of about 100° C.

5. A process for preparing 1-chloro-2-fluoroethylene which comprises subjecting 1,2-dichloro-2-fluoroethane to the action of a fluoride salt of a metal selected from the class consisting of sodium and potassium in a sealed vessel at elevated temperatures.

6. A process as described in claim 5 wherein the reaction is conducted at a temperature of about 250° C.

7. A process as described in claim 5 wherein the reaction is conducted in a sealed metallic vessel composed predominantly of iron.

References Cited in the file of this patent

Lovelace et al.: Aliphatic Fluorine Compounds, 1958, pp. 100–104, Reinhold Publishing Corp., N.Y.